US007149305B2

(12) United States Patent
Houghton (10) Patent No.: US 7,149,305 B2
(45) Date of Patent: Dec. 12, 2006

(54) COMBINED SIDETONE AND HYBRID BALANCE

(75) Inventor: Philip Houghton, Surrey (CA)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/622,499

(22) Filed: Jul. 18, 2003

(65) Prior Publication Data

US 2005/0013430 A1 Jan. 20, 2005

(51) Int. Cl.
*H04M 9/00* (2006.01)
(52) U.S. Cl. .................. 379/391; 379/406.02
(58) Field of Classification Search ........... 379/406.03, 379/406.08, 391; 370/267
See application file for complete search history.

(56) References Cited

U.S. PATENT DOCUMENTS

| 5,307,405 A * | 4/1994 | Sih ................... 379/406.08 |
| 6,466,550 B1 * | 10/2002 | Foster et al. ............ 370/261 |
| 6,522,746 B1 * | 2/2003 | Marchok et al. ....... 379/406.03 |
| 6,751,203 B1 * | 6/2004 | Eshmawy et al. .......... 370/286 |
| 2004/0052358 A1 * | 3/2004 | Lashley et al. .......... 379/387.01 |

OTHER PUBLICATIONS

Vijaykumar, T.N. et al.; ECE/CS 552: Chapter 5; University of Wisconsin-Madison; Spring 2002, slides 38-56 (http://homepages.cae.wisc.edu/~mikko/552/ch5.ppt), retrieved Oct. 20, 2004.*

* cited by examiner

*Primary Examiner*—Sinh Tran
*Assistant Examiner*—Walter F Briney, III
(74) *Attorney, Agent, or Firm*—McAndrews, Held & Malloy (57) ABSTRACT

A combined sidetone and hybrid balance apparatus and method of operating same are disclosed. An embodiment of the present invention may provide both a hybrid balance mode of operation and a sidetone generation mode of operation within a single integrated circuit device. The functionality provided by an embodiment of the present invention may be used in both Internet protocol (IP)-based telephones and residential gateways, and may be incorporated within the IP telephone chip used in such devices. An embodiment of the present invention may be used to reduce processor demand and the cost of materials, permitting greater IP telephone or residential gateway functionality at lower cost.

20 Claims, 7 Drawing Sheets

COMBINED SIDETONE AND HYBRID BALANCE

RELATED APPLICATIONS

[Not Applicable]

INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Traditional analog telephones connect to the public switched telephone network (PSTN) via a two-wire analog local loop that carries both the received and transmitted audio signals. Much of the PSTN, however, operates using a four-wire path, in which separate paths are used for signals entering the network (i.e., ingress) and leaving the network (i.e., egress). At some point near the subscriber, circuitry at a telephone network facility converts the four-wire path used within the network to the bi-directional, two-wire path that connects the network to the subscriber. Circuitry within the subscriber's analog telephone converts the bi-directional, two-wire, analog loop connection back to separate, one-way signal interfaces to the handset receiver (i.e., earpiece) and from the handset transmitter (i.e., microphone). This circuit that makes this four-wire to two-wire conversion is normally referred to as a "hybrid network".

An additional function of the hybrid network in the analog telephone is the management of the level of "sidetone" provided. Sidetone is the return of a speaker's voice from the handset transmitter to the handset receiver, and is an expected component in the signal at the handset receiver. The level of sidetone affects the loudness with which a user speaks. Too much sidetone results in the speaker talking too softly, while too little sidetone causes the speaker to talk too loudly.

An Internet protocol (IP)-based telephony network operates using separate transmit (i.e., ingress) and receive (i.e., egress) paths (i.e., a "four-wire" configuration). Because the IP telephony network has separate ingress and egress paths, IP telephones do not need to perform two-wire to four-wire conversion, and do not have a hybrid network. The absence of the hybrid network eliminates the circuitry that normally provides sidetone, prompting designers of IP station sets to create another means to provide sidetone.

Sidetone can be generated either in the software or the circuitry of the IP telephone. Much of the functionality of an IP telephone reside in a single integrated circuit referred to an "IP telephone chip". The generation of sidetone in software is fairly straightforward. The voice samples from the handset microphone are adjusted in amplitude and mixed with the speech signals from the IP telephony network on their way to the handset receiver. In practice, however, the process places heavy demands upon the processor in the IP telephone chip, impacting overall IP telephone system performance. Moving the sidetone generation functionality into the circuitry of the IP telephone phone chip is desirable, as it reduces the cost to manufacture the IP telephone, eliminates the need for external sidetone generation circuitry, and avoids the negative effects of implementing sidetone in software.

A second use for IP telephone chips is in a device commonly referred to as a "residential gateway." A residential gateway is a type of network gateway used to interface a packet-based IP telephony network to a conventional analog telephone loop, permitting cable, digital subscriber line (DSL), and other broadband service providers to also offer residential telephone service. In order to convert the separated egress and ingress path (four-wire) IP telephony network arrangement to the two-wire analog loop connection, an IP telephone chip in a residential gateway is typically coupled to a hybrid network. An undesirable side effect of a hybrid network is the creation of a small amount of leakage or "echo" of the signal from the egress path to the ingress path, reflecting a portion of the speech signal from the IP telephony network back to the far-end (i.e., sending) party as echo. The level of echo generated by a hybrid network is normally low, and is typically not a problem in traditional circuit-switched networks. It becomes problematic, however, on transmission paths with a large amount of end-to-end delay, most notably in networks comprising satellite circuits and packet networks (i.e., IP-based telephony networks). Circuits known as echo cancellers are normally used to minimize the audible effects of such echo. In this type of application, an echo canceller is used to remove the hybrid network leakage (i.e., echo) from the signal on the ingress path, by subtracting a scaled and delayed copy of the signal on the egress path. An echo canceller used in this application is normally referred to as a "digital hybrid balance".

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in a combined sidetone and hybrid balance apparatus comprising at least one filter; a combiner, a first switch, a second switch, a third switch, and a fourth switch. In an embodiment of the present invention, the at least one filter may have an input and an output. The combiner may have at least a first input and a second input, where the second input may be coupled to the output of the at least one filter. The combiner may combine the at least a first input and a second input to produce an output. The first switch may couple a first input signal to the first input of the combiner in a first mode of operation, and may couple a second input signal to the first input of the combiner in a second mode of operation. The second switch may couple the output of the combiner to a first output in the first mode of operation, and may couple the input of the at least one filter to the first output in the second mode of operation. The third switch may couple a second input signal to the input of the at least one filter in the first mode of operation, and may couple the first input signal to the input of the at least one filter in the second mode of operation. Finally, the fourth switch may couple the input of the at least one filter to a second output in the first mode of operation, and may couple the output of the combiner to the second output in the second mode of operation.

The at least one filter in an embodiment of the present invention may be a digital filter, and the at least one filter may be a finite element response (FIR) filter. In another embodiment, the at least one filter may be a finite element response (FIR) filter with at least three taps. The at least one filter may use a first predetermined set of filter coefficients in the first mode of operation, and may use a second predetermined set of filter coefficients in the second mode of operation, where the first predetermined set of filter coefficients and the second predetermined set of filter coefficients may be different. In an embodiment in accordance with the present invention, the combining may comprise one of at least adding the first input to the second input, adding the first input to the negative of the second input, and subtracting the second input from the first input. In addition, the functionality of an embodiment of the present invention may be contained within a single integrated circuit device.

Additional aspects of the present invention may be seen in a combined sidetone and hybrid balance apparatus comprising a first signal path carrying a first signal, a second signal path carrying a second signal, a mode input having at least a first state and a second state, and a reconfigurable filter for modifying at least one of the first signal and the second signal. An embodiment of the present invention may generate a sidetone signal in the first signal by combining at least a portion of the second signal with the first signal when the mode input is in the first state, and cancel an echo in the second signal by subtracting at least a portion of the first signal from the second signal when the mode input is in the second state. The signals in the first signal path and the second signal path may be digital signals, and the apparatus may be contained within a single integrated circuit.

Another aspect of the present invention may be seen in a method of operating a combined sidetone and hybrid balance apparatus, the method comprising receiving a first input signal and receiving a second input signal. When in a first mode of operation, the method may further comprise filtering the second input signal; combining the first input signal and the filtered second input signal to produce a combined signal; transmitting the combined signal on a first output; and transmitting the second input signal on a second output. When in a second mode of operation, the method may comprise filtering the first input signal; transmitting the first input signal on the first output; combining the second input signal and the filtered first input signal to produce a combined signal; and transmitting the combined signal on the second output. The filtering may use a digital filter, and the filtering may use a finite impulse response filter. Further, the filtering may use a finite impulse response filter with at least three taps, and the filtering may use a first predetermined set of filter coefficients in the first mode of operation, and a second predetermined set of filter coefficients in the second mode of operation, where the first predetermined set of filter coefficients and the second predetermined set of filter coefficients may be different.

A further aspect of the present invention may be seen in a method of operating a combined sidetone and hybrid balance apparatus having a first signal path and a second signal path, in which the method comprises receiving a control signal having at least a first state and a second state, and configuring an electrical circuit based upon the control signal. The method may further comprise generating a sidetone signal in the first signal path by adding at least a portion of the signal from the second signal path to the signal in the first signal path if the control signal is in the first state, and canceling an echo signal in the second signal path by subtracting from the signal in the second signal path a modified version of the signal in the first signal path if the control signal is in the second state. The signals traversing the first signal path and the second signal path may be digital signals, and the method may be performed within a single integrated circuit device.

The combining in an embodiment of the present invention may comprise one of at least adding the first input to the second input, adding the first input to the negative of the second input, and subtracting the second input from the first input. In addition, the receiving, filtering, combining, and transmitting in an embodiment in accordance with the present invention may be performed within a single integrated circuit device.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention relate in general to the processing of voice band signals in a Internet protocol (IP)-based telephony network. Certain aspects of the present invention relate to a device that may be configured to provide either sidetone generation or digital hybrid balance functionality.

Figure 1:
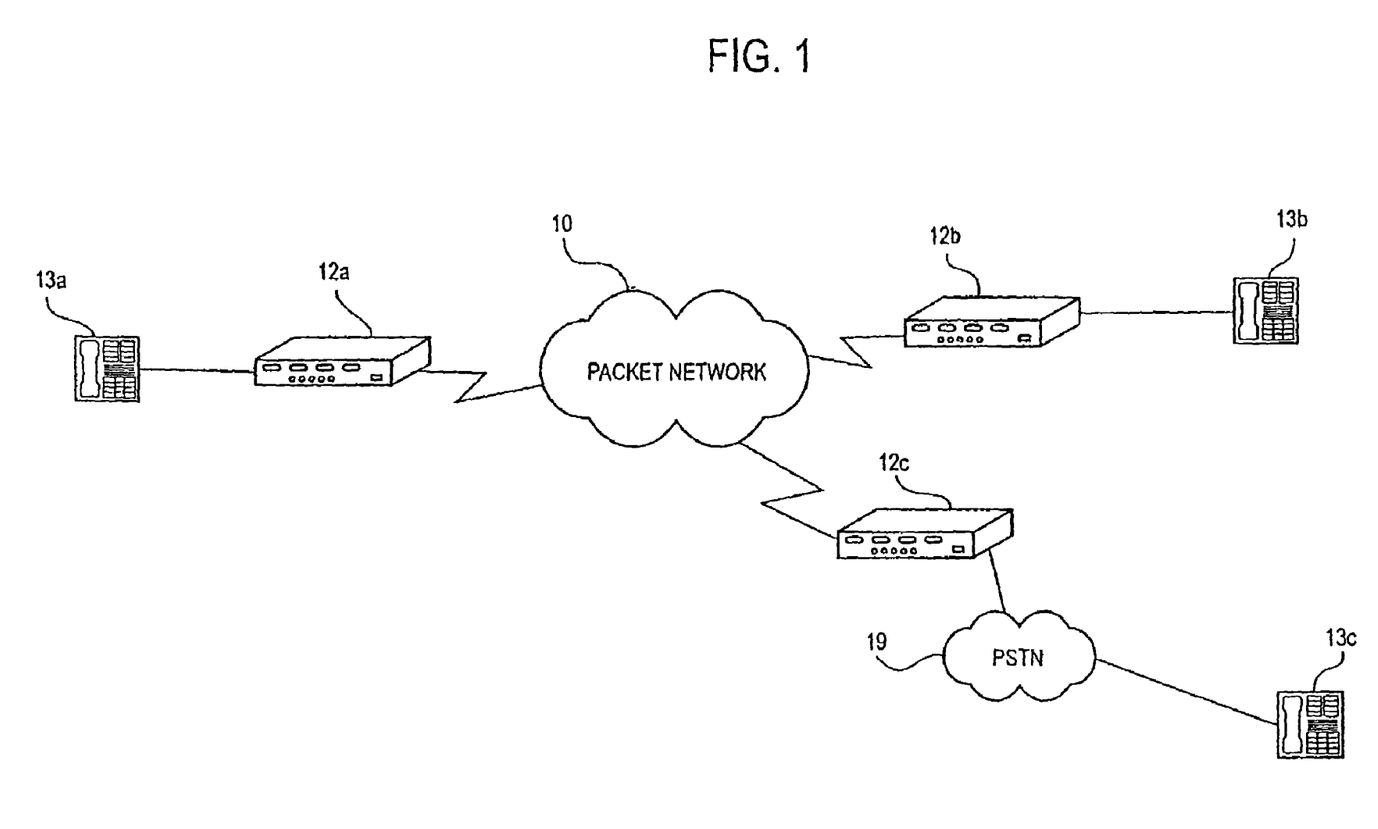
FIG. 1 is a functional block diagram representing an exemplary communication system that enables the transmission of voice data over a packet-based system such as voice-over-IP (VoIP, H.323), Voice over Frame Relay (VoFR, FRF-11), Voice Telephony over ATM (VTOA), or any other proprietary network, according to an illustrative embodiment of the present invention.

FIG. 1 is a functional block diagram representing an exemplary communication system that enables the transmission of voice data over a packet-based system such as voice-over-IP (VoIP, H.323), Voice over Frame Relay (VoFR, FRF-11), Voice Telephony over ATM (VTOA), or any other proprietary network, according to an illustrative embodiment of the present invention. In one embodiment of the present invention, voice data can also be carried over traditional media such as time division multiplex (TDM) networks and voice storage and playback systems. Packet-based network 10 provides a communication medium between telephony devices. Network gateways 12a and 12b support the exchange of voice between packet-based network 10 and telephony devices 13a and 13b. Network gateways 12a and 12b include a signal processing system which provides an interface between the packet-based network 10 and telephony devices 13a and 13b. Network gateway 12c supports the exchange of voice between packet-based network 10 and a traditional circuit-switched network 19, which transmits voice data between packet-based network 10 and telephony device 13c. In the described exemplary embodiment, each network gateway 12a, 12b, 12c supports a telephony device 13a, 13b, 13c.

Each network gateway 12a, 12b, 12c could support a variety of different telephony arrangements. By way of example, each network gateway might support any number of telephony devices, circuit-switched networks and/or packet-based networks including, among others, analog telephones, Ethernet phones, fax machines, data modems, PSTN lines (Public Switched Telephone Network), ISDN lines (Integrated Services Digital Network), T1 systems, PBXs, key systems, or any other conventional telephony device and/or circuit-switched/packet-based network. In the described exemplary embodiment, two of the network gateways 12a, 12b provide a direct interface between their respective telephony devices and the packet-based network 10. The other network gateway 12c is connected to its respective telephony device through a circuit-switched network such as a PSTN 19. The network gateways 12a, 12b, 12c permit voice, fax and modem data to be carried over packet-based networks such as PCs running through a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13x), CDMA (IS-9x), or GSM for terrestrial wireless applications, or any other packet-based system.

Figure 2:
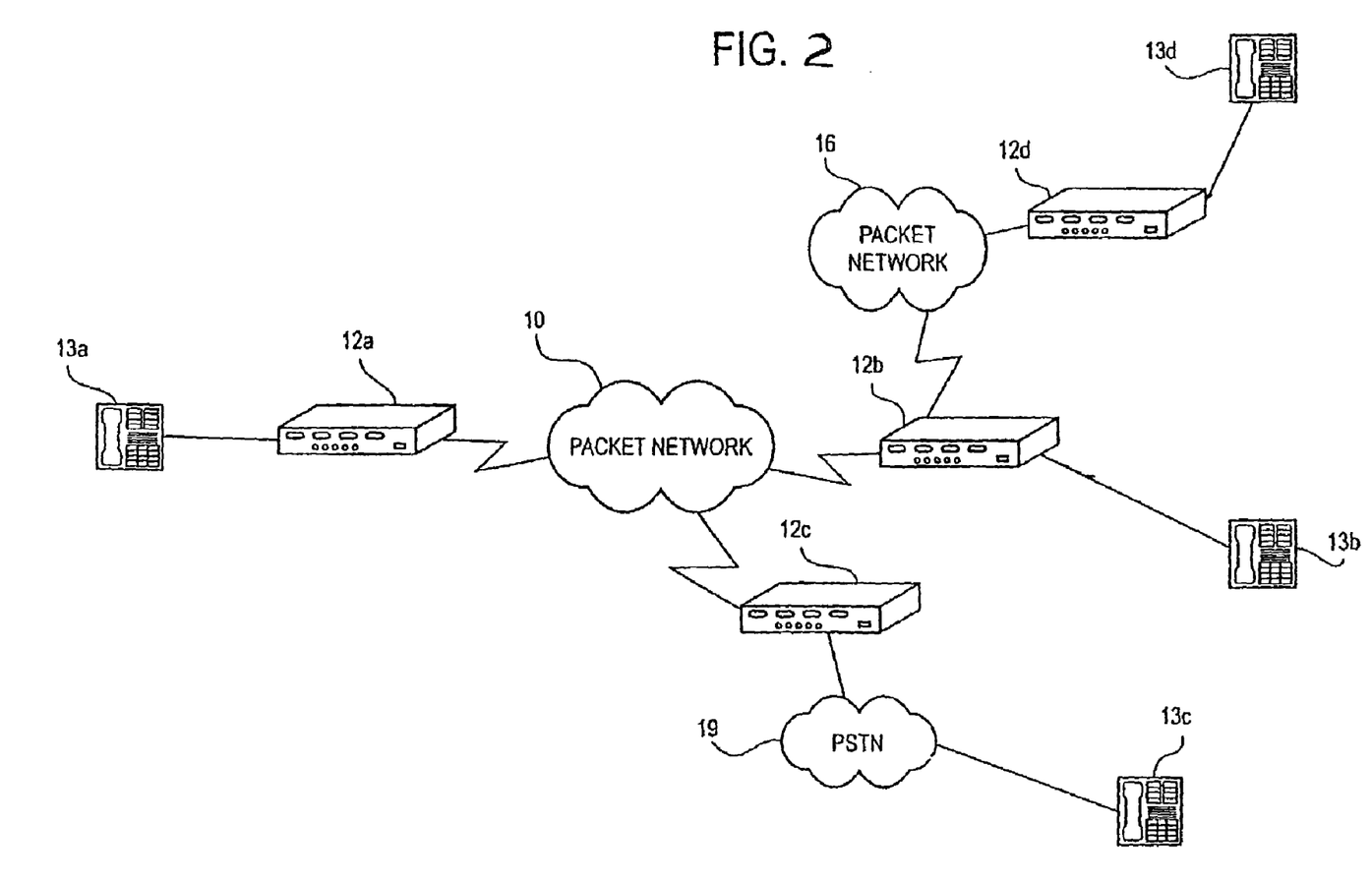
FIG. 2 is a functional block diagram representing another exemplary communication system similar to that of FIG. 1, but that includes a second packet-based network that is connected to packet-based network and to telephony device via network gateway, according to an illustrative embodiment of the present invention.

FIG. 2 is a functional block diagram representing another exemplary communication system similar to that of FIG. 1, but that includes a second packet-based network 16 that is connected to packet-based network 10 and to telephony device 13b via network gateway, according to an illustrative embodiment of the present invention. The signal processing system of network gateway 12b provides an interface between packet-based network 10 and packet-based network 16 in addition to an interface between packet-based networks 10, 16 and telephony device 13b. Network gateway 12d includes a signal processing system which provides an interface between packet-based network 16 and telephony device 13d.

Figure 3:
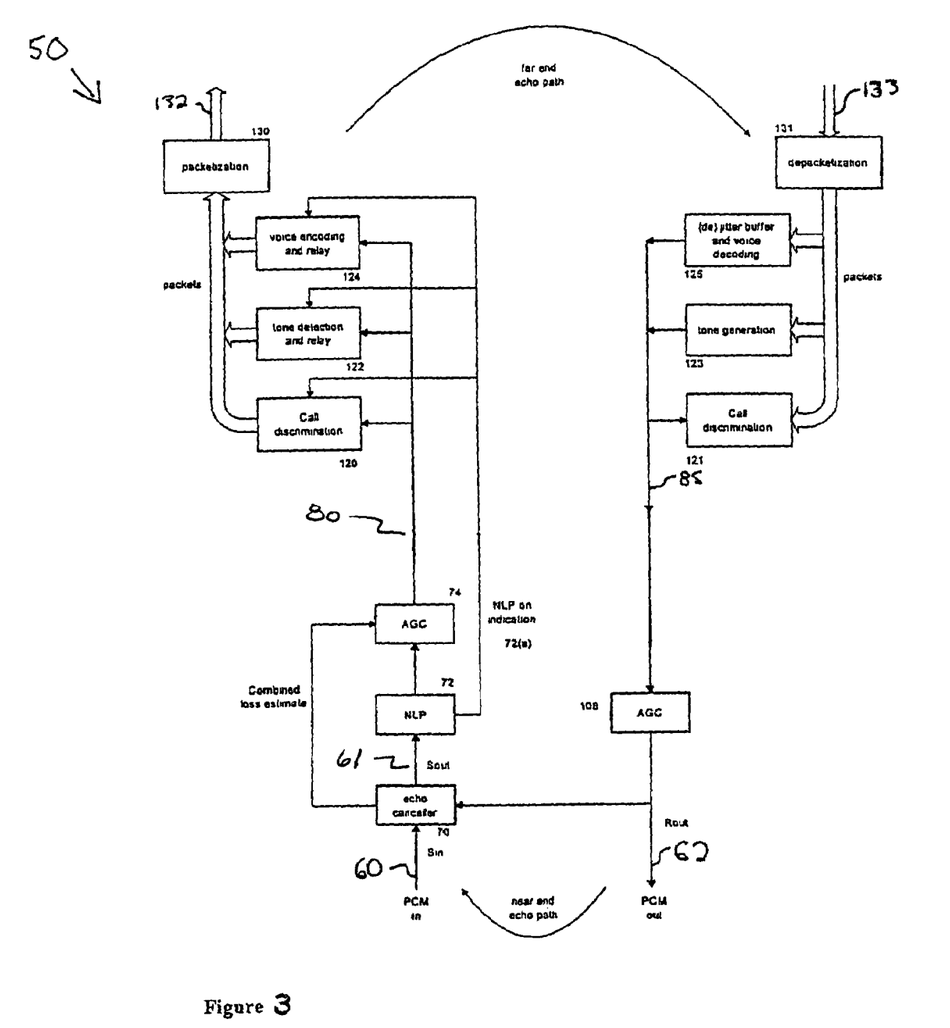
FIG. 3 is a block diagram illustrating the services invoked by a packet voice transceiver system, according to an illustrative embodiment of the present invention.

FIG. 3 is a block diagram illustrating the services invoked by a packet voice transceiver system 50, according to an illustrative embodiment of the present invention. In an illustrative embodiment of the present invention, the packet voice transceiver system 50 resides in a residential gateway such as network gateway 12c of FIG. 1, or in an IP telephone such as the IP telephones 13a and 13b of FIG. 1. In an exemplary embodiment, packet voice transceiver system 50 may be used to provide two-way communication with a telephone or a circuit-switched network, such as a PSTN line (e.g. DS0), or may be used within an IP telephone. The packet voice transceiver 50 receives digital voice samples 60, such as a 64 kb/s pulse code modulated (PCM) signal, from a telephone or circuit-switched network.

The incoming PCM signal 60 is initially processed by a near-end echo canceller 70 to remove near-end echoes that might otherwise be transmitted back to the far-end user. As the name implies, echoes in telephone systems are the return of the talker's voice resulting from the operation of the hybrid with its two-four wire conversion, or the acoustic echo of speech signal from the receiver to the transmitter of a voice terminal. If there is low end-to-end delay, echo from the far end is equivalent to sidetone (echo from the near-end), and therefore, not a problem. Sidetone gives users feedback as to how loudly they are talking and indeed, without sidetone, users tend to talk too loudly. However, far end echo delays of more than about 10 to 30 milliseconds (ms) significantly degrade the voice quality and are a major annoyance to the user.

For the purposes of this patent application, the user from which the ingress PCM signal 60 is received will be referred to as the near-end user. Thus the outgoing (egress) PCM signal 62 is provided to the near-end user. The user that receives the ingress packet voice signal 132, and that transmits the egress packet voice signal 133, will be referred to as the far-end user. However, it is to be understood that the "near-end" user, that sends and receives PCM signals 60 and 62, respectively, may reside either at a local device (such as a telephone) or at a device located across a circuit switched network. In an alternate embodiment such as, for example, a device that bridges an ATM network and an IP network, PCM signals 60 and 62 may instead be packet streams to be carried by a packet-based network, without departing from the spirit of the present invention.

Near-end echo canceller 70 is used to remove echoes of far-end speech present on the incoming PCM signal 60 before routing the incoming PCM signal 60 back to the far-end user. The near-end echo canceller 70 samples an outgoing PCM signal 62 from the far-end user, filters it, and combines it with the incoming PCM signal 60. In an exemplary embodiment, the near-end echo canceller 70 is followed by a non-linear processor (NLP) 72 which may mute the digital voice samples when far-end speech is detected in the absence of near-end speech. The NLP 72 may also inject comfort noise, which, in the absence of near end speech, may be roughly at the same level as the true background noise or at a fixed level.

When used in a residential gateway, near-end echo canceller 70 may be split into two components (not shown). The first component may be a short-tailed, non-adaptive echo canceller which is implemented in hardware, while the second component may be an adaptive echo canceller having a much longer tail length, and which may be implemented in software. A function of the first component, which is referred to as a "hybrid balance", is to remove on average that part of the echo that may be generated by the hybrid network used in the residential gateway for four-wire to two-wire conversion. The use of a hybrid balance keeps the echo from the hybrid network below a maximum level, allowing the second component to properly adapt to, and to differentiate between echo and a local talker. The second echo canceller component may then remove to a much greater degree of attenuation any echo remaining after operation of the hybrid balance. The combination permits the use of hybrid networks with a higher native echo than would otherwise be possible, resulting in a reduced cost to manufacture.

In such an embodiment, the second, software-based echo canceller component may be used only in a voice mode of operation. During calls in which modem or facsimile signals are present, the software echo canceller may be disabled. The hybrid balance, however, may continues to operate, and may provide reduction in the level of echo from the hybrid network. This additional level of echo reduction enables modems and facsimile machines to operate at maximum speeds.

After echo cancellation, the power level of the digital voice samples is normalized by automatic gain control (AGC) 74 to ensure that the conversation is of an acceptable loudness. Alternatively, the AGC can be performed before the near-end echo cancellation 70. However, this approach would entail a more complex design because the gain would also have to be applied to the sampled outgoing PCM signal 62. In the described exemplary embodiment, the AGC 74 is designed to adapt slowly in normal operation, but to adapt more quickly if overflow or clipping is detected. In one embodiment, the AGC adaptation is held fixed if the NLP 72 is activated.

In the voice mode, the transceiver 50 invokes three services, namely call discrimination 120, packet voice exchange 124, and packet tone exchange 122. The call discriminator analyzes the digital voice samples to determine whether a 2100 Hz tone (as in the case when the telephony device is a fax or a modem), a 1100 Hz tone or V.21 modulated high-level data link control (HDLC) flags (as in the case when the telephony device is a fax) are present. If a 1100 Hz tone or V.21 modulated HDLC flags are detected, a calling fax machine is recognized. The voice mode services are then terminated and the packet fax exchange is invoked to process the call. If a 2100 Hz tone is detected, the voice mode services are terminated and the packet data exchange is invoked. In the absence of a 2100 Hz tone, a 1100 Hz tone, or HDLC flags, the digital voice samples are coupled to the encoder system 124 and tone detection 122. The encoder system illustratively includes a voice encoder, a voice activity detector (VAD) and a comfort noise estimator. Tone detection 122 illustratively comprises a dual tone multi-frequency (DTMF) detector and a call progress tone detector. The outputs of the call discriminator 120, tone detection 122 and voice encoder 124 are provided to a packetization engine 130 which packetizes the data and transmits the packets 132 over the packet voice network.

Typical telephone conversations have as much as sixty percent silence or inactive content. Therefore, high bandwidth gains can be realized if digital voice samples are suppressed during these periods. In an illustrative embodiment of the present invention, a voice activity detector (VAD), operating under the packet voice exchange 124, is used to accomplish this function. The VAD attempts to detect digital voice samples that do not contain active speech. During periods of inactive speech, a comfort noise estimator, also operating under the packet voice exchange 124, provides silence identifier (SID) packets to the packetization engine 130. The SID packets contain voice parameters that allow the reconstruction of the background noise at the far end.

From a system point of view, the VAD may be sensitive to the change in the NLP 72. For example, when the NLP 72 is activated, the VAD may immediately declare that voice is inactive. In that instance, the VAD may have problems tracking the true background noise level. If the NLP 72 generates comfort noise during periods of inactive speech, it may have a different spectral characteristic from the true background noise. The VAD may detect a change in noise character when the NLP 72 is activated (or deactivated) and declare the comfort noise as active speech. For these reasons, in an illustrative embodiment of the present invention, the VAD is disabled when the NLP 72 is activated, as indicated by a "NLP on" message 72*a* passed from the NLP 72 to the voice encoding system 124.

The voice encoder, operating under the packet voice exchange 124, can be a straight 16-bit PCM encoder or any voice encoder which supports one or more of the standards promulgated by ITU. The encoded digital voice samples are formatted into a voice packet (or packets) by the packetization engine 130. These voice packets are formatted according to an applications protocol and outputted to the host (not shown). The voice encoder is invoked only when digital voice samples with speech are detected by the VAD.

In the described exemplary embodiment, voice activity detection is applied after the AGC 74. This approach provides optimal flexibility because the VAD and the voice encoder are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as through set forth in full herein.

Operating under the packet tone exchange 122, a DTMF detector determines whether or not there is a DTMF signal present at the near end. The DTMF detector also provides a pre-detection flag which indicates whether or not it is likely that the digital voice sample might be a portion of a DTMF signal. If so, the pre-detection flag is relayed to the packetization engine 130 instructing it to begin holding voice packets. If the DTMF detector ultimately detects a DTMF signal, the voice packets are discarded, and the DTMF signal is coupled to the packetization engine 130. Otherwise the voice packets are ultimately released from the packetization engine 130 to the host (not shown). The benefit of this method is that there is only a temporary impact on voice packet delay when a DTMF signal is pre-detected in error, and not a constant buffering delay. In one embodiment, whether voice packets are held while the pre-detection flag is active is adaptively controlled by the user application layer.

A call progress tone detector also operates under the packet tone exchange 122 to determine whether a precise signaling tone is present at the near end. Call progress tones are tones that indicate what is happening to dialed phone calls. Conditions like busy line, ringing called party, bad number, and others each have distinctive tone frequencies and cadences assigned them. The call progress tone detector monitors the call progress state, and forwards a call progress tone signal to the packetization engine 130 to be packetized and transmitted across the packet-based network. The call progress tone detector may also provide information regarding the near-end hook status which is relevant to the signal processing tasks. If the hook status is "on-hook," the VAD should preferably mark all frames as inactive, DTMF detection should be disabled, and SID packets should only be transferred if they are required to keep the connection alive.

The decoding system of the packet voice transceiver system 50 essentially performs the inverse operation of the encoding system. The decoding system comprises a depacketizing engine 131, a call discriminator 121, tone generation functionality 123, and a voice decoding system 125.

The depacketizing engine 131 identifies the type of packets received from the host (i.e., voice packet, DTMF packet, call progress tone packet, SID packet) and transforms them into frames that are protocol-independent. The depacketizing engine 131 then provides the voice frames (or voice parameters in the case of SID packets) to the voice decoding system 125 and provides the DTMF frames and call progress tones to the tone generation functionality 123. In this manner, the remaining tasks are, by and large, protocol independent.

The voice decoding system 125 illustratively includes a jitter buffer that compensates for network impairments such as delay jitter caused by packets not arriving at the same time or in the same order in which they were transmitted. In addition, the jitter buffer compensates for lost packets that occur on occasion when the network is heavily congested. In one embodiment, the jitter buffer for voice includes a voice synchronizer that operates in conjunction with a voice queue to provide an isochronous stream of voice frames to the voice decoder.

In addition to a voice decoder and a jitter buffer, the voice decoding system 125 also illustratively includes a comfort noise generator and a lost packet recovery engine, a VAD and a comfort noise estimator. Sequence numbers embedded into the voice packets at the far end can be used to detect lost packets, packets arriving out of order, and short silence periods. The voice synchronizer analyzes the sequence numbers, enabling the comfort noise generator during short silence periods and performing voice frame repeats via the lost packet recovery engine when voice packets are lost. SID packets can also be used as an indicator of silent periods causing the voice synchronizer to enable the comfort noise generator. Otherwise, during far-end active speech, the voice synchronizer couples voice frames from the voice queue in an isochronous stream to the voice decoder. The voice decoder decodes the voice frames into digital voice samples suitable for transmission on a circuit switched network, such as a 64 kb/s PCM signal for a PSTN line. In the exemplary embodiment of FIG. 3, the output of the voice decoder is provided to AGC 108.

The comfort noise generator of the voice decoding system 125 provides background noise to the near-end user during silent periods. If the protocol supports SID packets, (and these are supported for VTOA, FRF-11, and VoIP), the comfort noise estimator at the far-end encoding system should transmit SID packets. Then, the background noise can be reconstructed by the near-end comfort noise generator from the voice parameters in the SID packets buffered in the voice queue. However, for some protocols, namely, FRF-11, the SID packets are optional, and other far-end users may not support SID packets at all. In these systems, the voice synchronizer must continue to operate properly. In the absence of SID packets, the voice parameters of the background noise at the far end can be determined by running the VAD at the voice decoder in series with a comfort noise estimator.

The tone generation functionality 123 illustratively includes a DTMF queue, a precision tone queue, a DTMF synchronizer, a precision tone synchronizer, a tone generator, and a precision tone generator. When DTMF packets arrive, they are depacketized by the depacketizing engine 131. DTMF frames at the output of the depacketizing engine 131 are written into the DTMF queue. The DTMF synchronizer couples the DTMF frames from the DTMF queue to the tone generator. Much like the voice synchronizer, the DTMF synchronizer provides an isochronous stream of DTMF frames to the tone generator. The tone generator of the tone generation system 123 converts the DTMF signals into a DTMF tone suitable for a standard digital or analog telephone, and provides the DTMF signal to AGC 108.

When call progress tone packets arrive, they are depacketized by the depacketizing engine 131. Call progress tone frames at the output of the depacketizing engine 131 are written into the call progress tone queue of the tone generation functionality 123. The call progress tone synchronizer couples the call progress tone frames from the call progress tone queue to a call progress tone generator. Much like the DTMF synchronizer, the call progress tone synchronizer provides an isochronous stream of call progress tone frames to the call progress tone generator. The call progress tone generator converts the call progress tone signals into a call progress tone suitable for a standard digital or analog telephone, and provides the DTMF signal to AGC 108.

Figure 4:
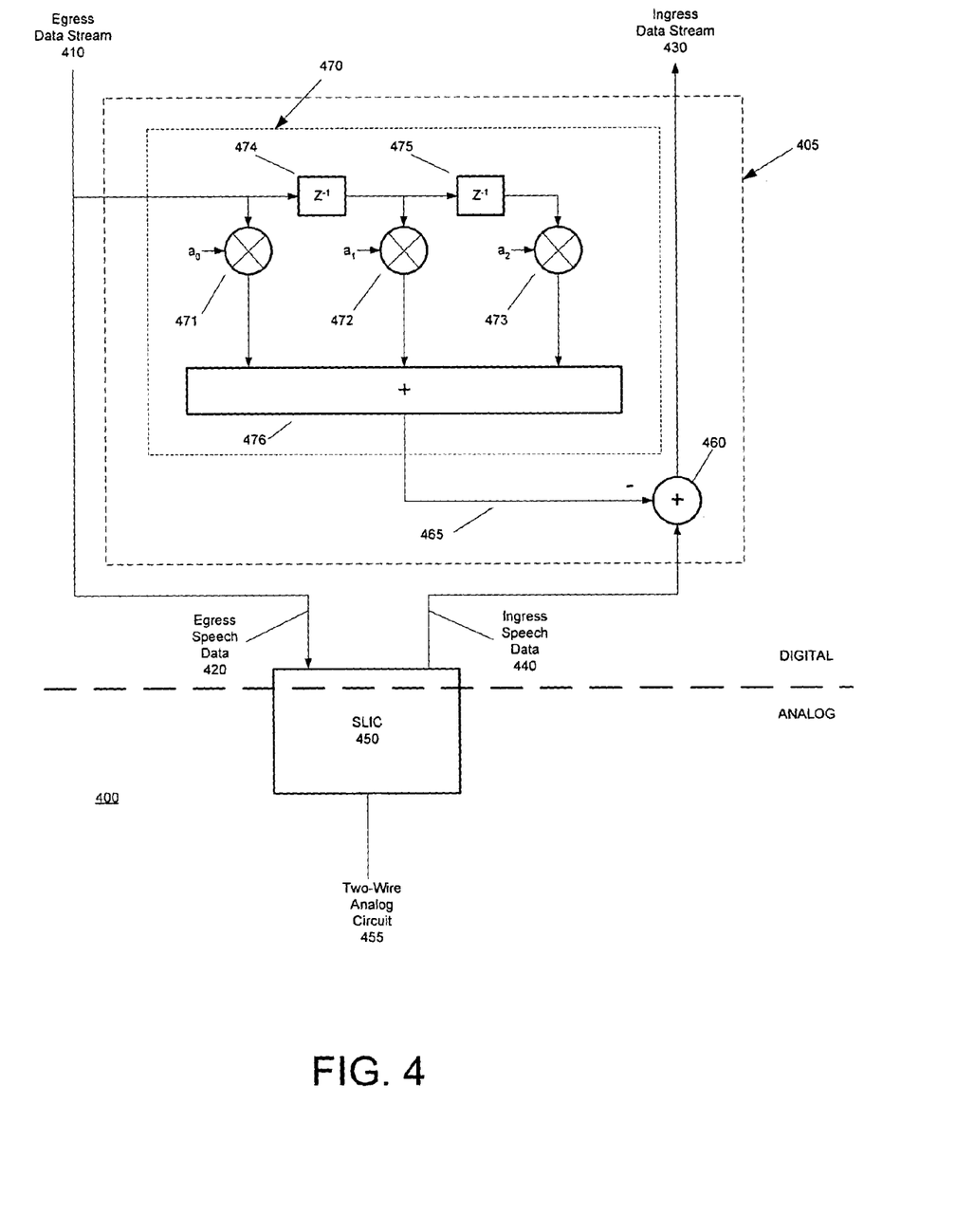
FIG. 4 is a block diagram illustrating an exemplary embodiment of a digital hybrid balance circuit and subscriber line interface circuit (SLIC), in accordance with the present invention.

FIG. 4 is a block diagram illustrating an exemplary embodiment of a digital hybrid balance circuit 405 and subscriber line interface circuit (SLIC) 450, in accordance with the present invention. The digital hybrid balance 405 and SLIC 450 may be a part of, for example, the network gateway 12c of FIGS. 1 and 2. During the operation of the exemplary network gateway device 12c of FIG. 1, a SLIC, such as SLIC 450 may generate a small but detectable amount of echo of the egress speech signals represented by egress speech data 420, in the ingress speech data 440. The egress speech data 420 may correspond to, for example, the PCM out signal 62 of FIG. 3, while the ingress speech data 440 may correspond to, for example, the PCM in signal 60 of FIG. 3. It is a function of the digital hybrid balance 405 to remove from the ingress speech data 440 the portion of the speech signal of the egress data stream 410 that is leaked by the SLIC 450. In the illustration of FIG. 4, the digital hybrid balance circuit 405 comprises a finite impulse response (FIR) filter 470 and an adder 460. Because the total delay within the SLIC 450 is very short, the FIR filter 470 of the digital hybrid balance circuit 405 illustrated in FIG. 4 has only three taps. The FIR filter 470 comprises two unit-delay elements 474, 475, three gain stages 471, 472, 473 having gain coefficients a0, a1, and a2, and an adder 476. The FIR filter 470 receives at its input the digitized speech samples from the egress data stream 410 and produces at its output 465 filtered digitized speech samples that are passed to the negated input of adder 460. The egress data stream 410 may correspond to, for example, the PCM out signal 62. In the egress path, the SLIC 450 provides digital-to-analog conversion of the digitized speech signals that make up the egress data stream 410, and four-wire to two-wire conversion, coupling the resulting egress analog speech signal to the two-wire analog circuit 455.

In the ingress path, the SLIC 450 separates the ingress analog signal from the two-wire analog circuit 455 and performs analog-to-digital conversion of the resulting ingress analog speech signal to form the ingress speech data 440. The digitized speech samples of the ingress speech data 440 are passed to the input of adder 460. The adder 460 represents combining functionality that may be, for example, an adder in which the input from FIR filter 470 is negated or complemented, a subtractor in which the minuend is the ingress speech data 440 and the subtrahend is the output from FIR filter 470, an adder used in combination with a set of coefficients $a_0$, $a_1$, and $a_2$ for FIR Filter 470 that result in a complementation of the estimated echo produced by FIR Filter 470 from the ingress speech data 440, or another arrangement having similar function. As shown in FIG. 4, the adder 460 removes from the digitized speech samples representing the ingress speech signal 440, an estimate of the SLIC 450 leakage produced by FIR Filter 470. The digitized speech samples output by adder 460 are then passed to the ingress data stream 430. The ingress data stream 430 may correspond to, for example, the $S_{out}$ signal 61 of FIG. 3.

Figure 5:
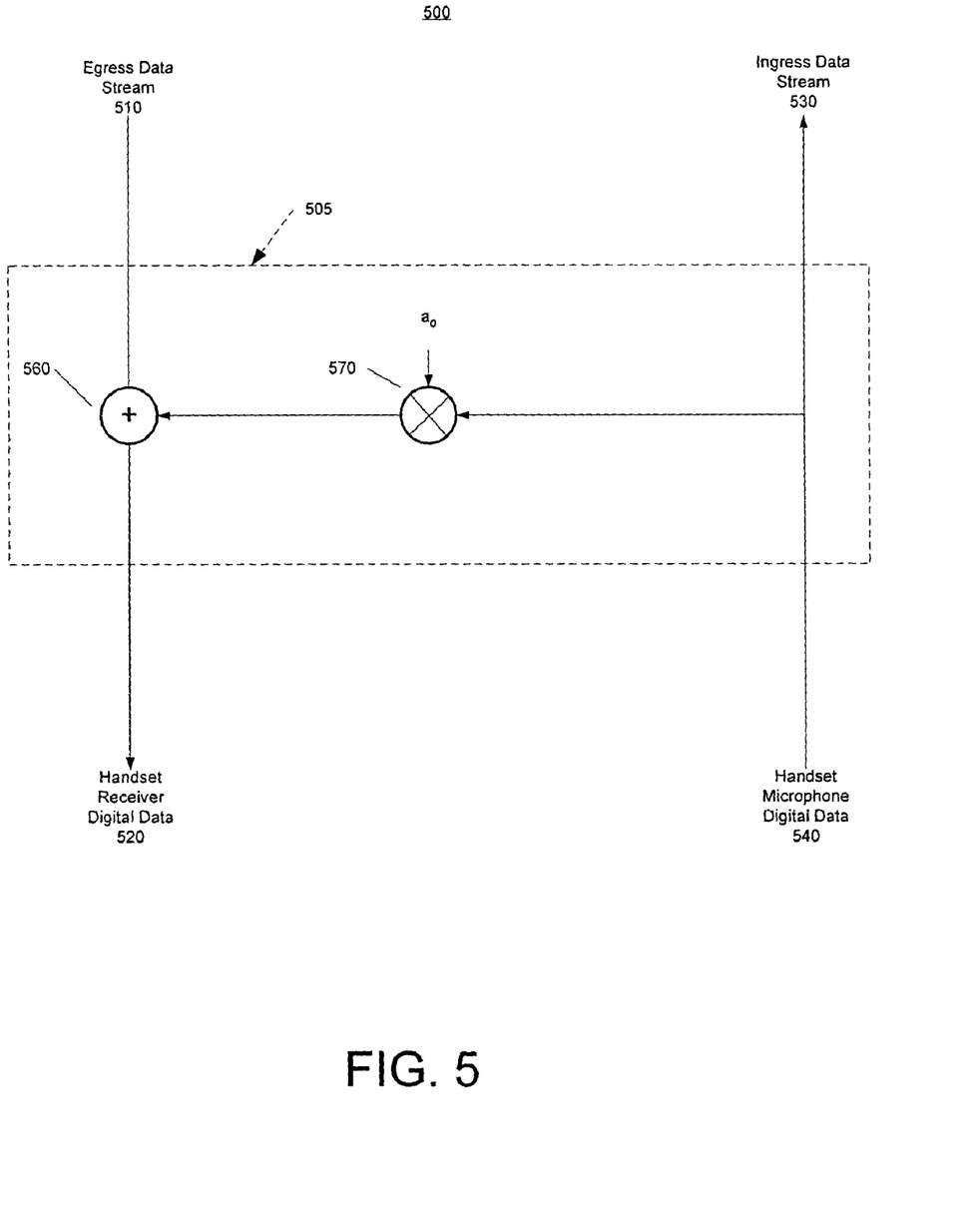
FIG. 5 is a block diagram illustrating an exemplary embodiment of a sidetone generation circuit, in accordance with the present invention.

FIG. 5 is a block diagram illustrating an exemplary embodiment of a sidetone generation circuit 505, in accordance with the present invention. The sidetone generation circuit 505 may be a function that is provided by the IP telephone chip used in, for example, the IP telephones 13*a* and 13*b* of FIG. 1, and 13*a*, 13*b*, and 13*d* of FIG. 1A. The sidetone generation circuit 505 of FIG. 5 comprises an adder 560, and a gain stage 570 with gain coefficient, $a_0$. It is a function of the sidetone generation circuit 505 to combine a portion of the handset microphone signal represented by handset microphone data stream 540, with the egress speech signal represented by the egress data stream 510. The handset microphone data stream 540 may correspond to, for example, the PCM in signal 60 of FIG. 3, and the egress data stream 510 may correspond to, for example, the PCM out signal 62 of FIG. 3. The combined speech signal produced by the adder 560 is then provided to the handset of an IP telephone device via the handset receiver data stream 520. The gain coefficient, $a_0$, of the gain stage 570 determines the level of sidetone provided to the handset receiver.

Figure 6:
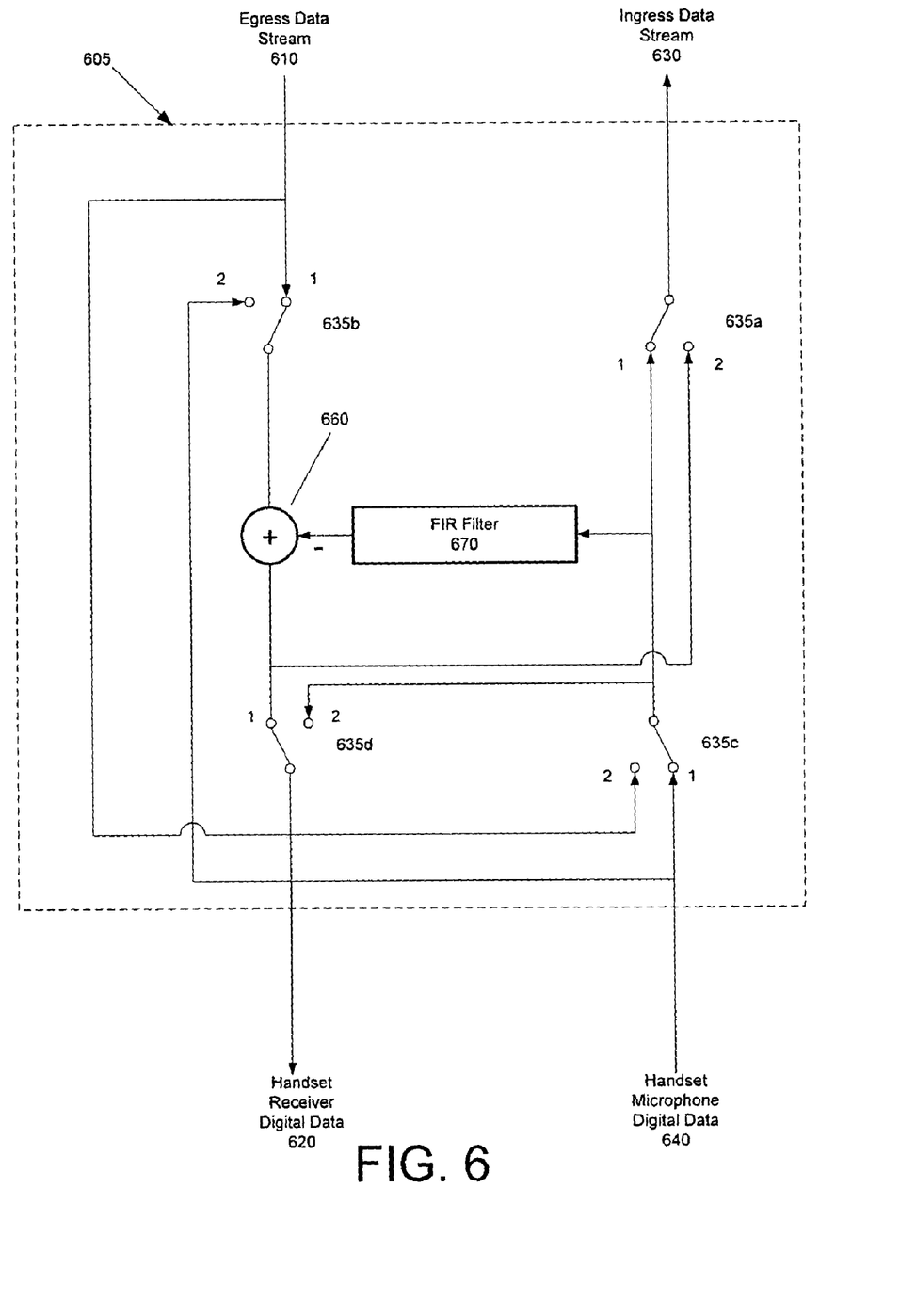
FIG. 6 is a schematic block diagram of an exemplary embodiment of a combined sidetone and digital hybrid balance circuit configured to provide sidetone generation, in accordance with the present invention.

FIG. 6 is a schematic block diagram of an exemplary embodiment of a combined sidetone and digital hybrid balance circuit 605 configured to provide sidetone generation, in accordance with the present invention. The combined sidetone and digital hybrid balance circuit 605 comprises an FIR filter 670, an adder 660, and four switch elements 635*a*, 635*b*, 635*c*, 635*d*. The FIR filter 670 in an embodiment in accordance with the present invention may correspond to, for example, the FIR filter 470 of FIG. 4. The adder 660 may correspond to, for example, the adder 460 of FIG. 4. The four switch elements 635*a*, 635*b*, 635*c*, 635*d* in the illustration of FIG. 6 are shown in position '1'. The four switch elements 635*a*, 635*b*, 635*c*, 635*d* operate in unison, such that they are either all in position '1' or all in position '2'.

In the embodiment illustrated in FIG. 6, digitized speech samples from the egress data stream 610 are coupled by the switch element 635*b* to one of the two inputs of the adder 660. The egress data stream 610 may correspond to, for example, the egress speech data 420 of FIG. 4, or the PCM out signal 62 of FIG. 3. The other input to the adder 660 receives a negated copy of the output of the FIR filter 670. The input of the FIR filter 670 receives each of the digitized speech samples of the handset microphone digital data 640 through the switch element 635*c*. The handset microphone digital data 640 may correspond to, for example, the handset microphone digital data 540 of FIG. 5, or the PCM in signal 60 of FIG. 3. The digitized speech samples from the handset microphone digital data 640 are also coupled through the switch element 635*a* to the ingress data stream 630. The ingress data stream 630 may correspond to, for example, the ingress data stream 530 of FIG. 5, or the PCM in signal 60 of FIG. 3. The FIR filter 670 produces at its output a filtered sequence of digitized speech samples, modified according to the filter coefficients defined for each of the taps of FIR filter 670. For example, an embodiment in accordance with the present invention may implement the FIR filter 670 of FIG. 6 using three taps with corresponding filter coefficients, $a_0$, $a_1$, and $a_2$, as in the exemplary digital hybrid balance circuit of FIG. 4. In the sidetone generation mode of operation, an embodiment of the present invention may set the filter coefficients, a1, and, a2, to zero (0), and the coefficient, a0, to a value that produces the desired level of sidetone. The negated output of the FIR filter 670 is then added to the digitized speech samples from the egress data stream 610 by adder 660, and passed by the switch element 635*d* to the handset receiver digital data 620. The handset receiver digital data 620 may correspond to, for example, the handset receiver digital data 520 of FIG. 5, or the PCM out signal 62 of FIG. 3.

Figure 7:
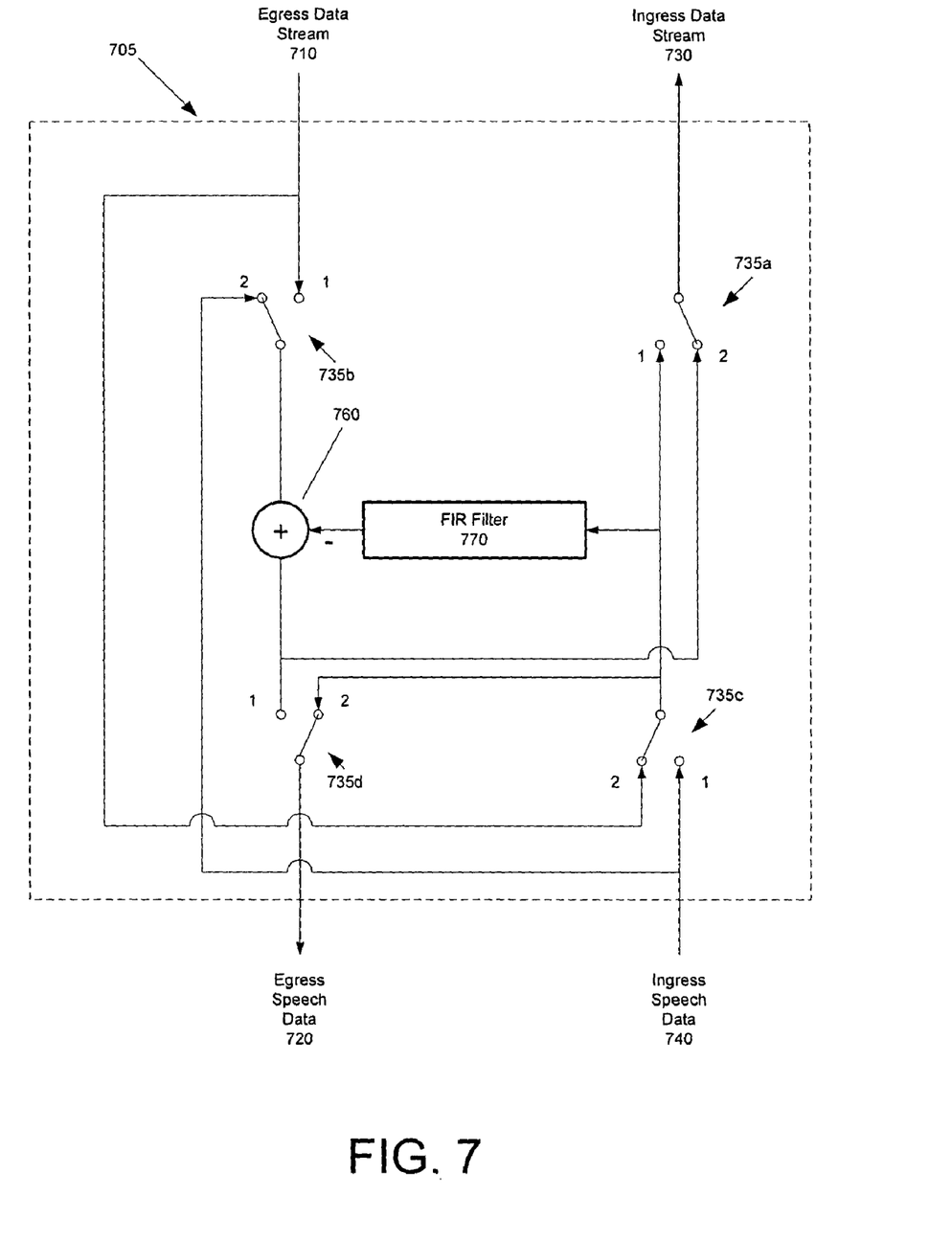
FIG. 7 is a schematic block diagram of an exemplary embodiment of a combined sidetone and digital hybrid balance circuit configured to operate as a digital hybrid balance circuit, in accordance with the present invention.

FIG. 7 is a schematic block diagram of an exemplary embodiment of a combined sidetone and digital hybrid balance circuit 705 configured to operate as a digital hybrid balance circuit, in accordance with the present invention. The FIR filter 770 in an embodiment in accordance with the present invention may correspond to, for example, the FIR filter 470 of FIG. 4, and the adder 760 may correspond to, for example, the adder 460 of FIG. 4. The four switch elements 735*a*, 735*b*, 735*c*, 735*d* in the illustration of FIG. 7 are shown in position '2'. As in the exemplary embodiment illustrated in FIG. 6, the four switch elements 735*a*, 735*b*, 735*c*, 735*d* operate in unison. That is, the four switch elements 735*a*, 735*b*, 735*c*, 735*d* are either all in position '1' or all in position '2'.

In the embodiment illustrated in FIG. 7, the digitized speech samples from the egress data stream 710 are coupled by the switch element 735*c* to the input of FIR filter 770. The egress data stream 710 may correspond to, for example, the egress data stream 410 of FIG. 4, the egress data stream 610 of FIG. 6, or the PCM out signal 62 of FIG. 3. The FIR filter 770 produces at its output a filtered sequence of digitized speech samples modified according to the filter coefficients defined for each of the taps of the FIR filter 770. For example, an embodiment in accordance with the present invention may implement the FIR filter 770 of FIG. 7 using three taps with corresponding filter coefficients, $a_0$, $a_1$, and $a_2$, as in the exemplary digital hybrid balance circuit of FIG. 4. In the digital hybrid balance mode of operation, an embodiment of the present invention may set the filter coefficients, $a_0$, $a_1$, and $a_2$ of FIR filter 770, that may correspond to the coefficients, $a_0$, $a_1$, and, $a_2$, of the FIR Filter 470 of FIG. 4, to values that have been predetermined as appropriate to cancel the echo generated by, for example, a SLIC such as the SLIC 450 of FIG. 4. The digitized speech samples from the egress data stream 710 are also coupled through the switch element 735*d* to the egress speech data 720. The egress speech data 720 may correspond to, for example, the egress speech data 420 of FIG. 4.

Continuing with respect to FIG. 7, the digitized speech samples from the ingress speech data 740 are passed by the switch element 735*b* to one of the two inputs of adder 760. The ingress speech data 740 may correspond to, for example, the ingress speech data 440 of FIG. 4. The other input of the adder 760 receives a negated copy of the output of the FIR filter 770. In this configuration, the adder 760 subtracts from the digitized speech samples of the ingress speech data 740 a filtered copy of the digitized speech samples of the egress data stream 710, removing an appropriate amount of the ingress speech signal represented by the digitized speech samples of ingress speech data 740 in order to cancel the echo produced by a SLIC such as, for example, the SLIC 450 of FIG. 4. The output of the adder 760 then passes through the switch element 735*a* to the ingress data stream 730. The ingress data stream 730 may correspond to, for example, the ingress data stream 430 of FIG. 4.

An embodiment in accordance with the present invention may combine the functionality illustrated by the digital hybrid balance circuit 405 of FIG. 4 and the sidetone generation circuit 505 of FIG. 5 allowing an embodiment of the present invention to be used in a wide variety of IP telephony equipment such as, for example, residential gateways and IP telephones. An embodiment of the present invention reduces IP telephone chip cost for all users by expanding the range of applications in which the IP telephone chip may be used. In addition, by moving the sidetone functionality into the IP telephone chip, an embodiment of the present invention reduces processing load, enhancing performance and reducing cost in IP telephone applications.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A combined sidetone and hybrid balance apparatus comprising:
   at least one filter, the at least one filter having an input and an output, wherein the at least one filter uses a first predetermined set of filter coefficients in a first mode of operation, and a second predetermined set of filter coefficients in a second mode of operation;
   a combiner having at least a first input and a second input, the second input coupled to the output of the at least one filter, the combiner for combining the at least a first input and a second input to produce an output;
   a first switch coupling a first input signal to the first input of the combiner in the first mode of operation, and coupling a second input signal to the first input of the combiner in the second mode of operation;
   a second switch coupling the output of the combiner to a first output in the first mode of operation, and coupling the input of the at least one filter to the first output in the second mode of operation;
   a third switch coupling the second input signal to the input of the at least one filter in the first mode of operation, and coupling the first input signal to the input of the at least one filter in the second mode of operation; and
   a fourth switch coupling the input of the at least one filter to a second output in the first mode of operation, and coupling the output of the combiner to the second output in the second mode of operation.

2. The combined sidetone and hybrid balance apparatus of claim 1 wherein the at least one filter is a digital filter.

3. The combined sidetone and hybrid balance apparatus of claim 1 wherein the at least one filter is a finite impulse response (FIR) filter.

4. The combined sidetone and hybrid balance apparatus of claim 3 wherein the at least one filter is a finite impulse response (FIR) filter with three taps.

5. The combined sidetone and hybrid balance apparatus of claim 1 wherein the first mode of operation is a hybrid balance mode and the second mode of operation is a sidetone mode.

6. The combined sidetone and hybrid balance apparatus of claim 1 wherein the combining comprises one of at least adding the first input to the second input, adding the first input to the negative of the second input, and subtracting the second input from the first input.

7. The combined sidetone and hybrid balance apparatus of claim 1 wherein the functionality is contained within a single integrated circuit device.

8. A combined sidetone and hybrid balance apparatus comprising:
   a first signal path carrying a first signal;
   a second signal path carrying a second signal;
   a mode signal taking one of a first state and a second state;
   a single non-adaptive filter for modifying one of the first signal and the second signal; and
   wherein the apparatus generates a sidetone signal in the first signal by combining at least a portion of the second signal with the first signal when the mode signal is in the first state, and cancels an echo in the second signal by subtracting at least a portion of the first signal from the second signal when the mode signal is in the second state.

9. The apparatus of claim 8 wherein the signals in the first signal path and the second signal path are digital signals.

10. The apparatus of claim 8 wherein the apparatus is contained within a single integrated circuit.

11. A method of operating a combined sidetone and hybrid balance apparatus for processing first and second input signals, the method comprising:
    before signal processing,
       determining one of a first mode and a second mode of operation,
       establishing a first fixed set of filter coefficients if operating in the first mode, and
       establishing a second fixed set of filter coefficients if operating in the second mode;
    when in the first mode of operation,
       filtering the second input signal using the first fixed set of filter coefficients;
       combining the first input signal and the filtered second input signal to produce a combined signal;
       transmitting the combined signal on a first output; and
       transmitting the second input signal on a second output, and
    when in the second mode of operation,
       filtering the first input signal using the second fixed set of filter coefficients;
       transmitting the first input signal on the first output;
       combining the second input signal and the filtered first input signal to produce a combined signal; and
       transmitting the combined signal on the second output.

12. The method of claim 11 wherein the filtering uses a digital filter.

13. The method of claim 11 wherein the filtering uses a finite impulse response filter.

14. The method of claim 13 wherein the filtering uses a finite impulse response filter with three taps.

15. The method of claim 11 wherein the first predetermined set of filter coefficients and the second predetermined set of filter coefficients are different.

16. The method of claim 11 wherein the combining comprises one of at least adding the first input to the second input, adding the first input to the negative of the second input, and subtracting the second input from the first input.

17. The method of claim 11 wherein the receiving, filtering, combining, and transmitting are performed within a single integrated circuit device.

18. A method of operating a combined sidetone and hybrid balance apparatus having a first signal path and a second signal path, the method comprising:
    receiving a control signal taking one of a first state and a second state;

configuring routing of signals in the first and second paths in an electrical circuit to perform non-adaptive filtering and combining, based upon the control signal;

generating a sidetone signal in the first signal path by adding at least a portion of the signal from the second signal path to the signal in the first signal path if the control signal is in the first state; and canceling an echo signal in the second signal path by subtracting from the signal in the second signal path a modified version of the signal in the first signal path if the control signal is in the second state.

19. The method of claim 18 wherein the signals traversing the first signal path and the second signal path are digital signals.

20. The method of claim 18 wherein the method is performed within a single integrated circuit device.

* * * * *